United States Patent [19]

Brokaw

[11] 4,098,264

[45] Jul. 4, 1978

[54] SOLAR LIQUID HEATING APPARATUS

[76] Inventor: Hal R. Brokaw, P.O. Box 273, Carmel, Calif. 93921

[21] Appl. No.: 696,668

[22] Filed: Jun. 16, 1976

[51] Int. Cl.² .............................................. F24J 3/02
[52] U.S. Cl. ................................... 126/271; 237/1 A
[58] Field of Search ................... 126/270, 271, 400; 237/1 A; 250/203; 60/641

[56] References Cited

U.S. PATENT DOCUMENTS

| | | | |
|---|---|---|---|
| 1,425,174 | 8/1922 | Cartter et al. | 126/271 |
| 1,951,403 | 3/1934 | Goddard | 126/271 |
| 3,847,136 | 11/1974 | Salvail | 126/271 |
| 3,861,379 | 1/1975 | Anderson, Jr. | 126/270 |
| 3,903,700 | 9/1975 | Glickman | 126/270 |
| 3,917,942 | 11/1975 | McCay | 126/270 |
| 3,931,806 | 1/1976 | Hayes | 126/271 |
| 3,985,119 | 10/1976 | Oakes | 126/271 |
| 3,990,430 | 11/1976 | Robertson | 126/271 |
| 4,000,734 | 1/1977 | Matlock et al. | 126/271 |

Primary Examiner—Kenneth W. Sprague
Assistant Examiner—James C. Yeung
Attorney, Agent, or Firm—R. S. Sciascia; G. J. Rubens

[57] ABSTRACT

A solar apparatus is provided for heating liquids such as water, to a high temperature by utilizing a movable parabolic heat collector to concentrate the sun's rays associated with a special piping arrangement to obtain progressive liquid pre-heating; a collector tracking device including photocells and a collimating system for controlling the movement of the collector to maintain alignment with the sun; a device for modulating the flow of the heat transfer liquid between the collector and the storage to maintain optimum heat replenishment therebetween; and also a vacuum insulated heat exchanger to isolate the heat transfer liquid from the water being heated.

6 Claims, 8 Drawing Figures

TILT CONTROL SYSTEM

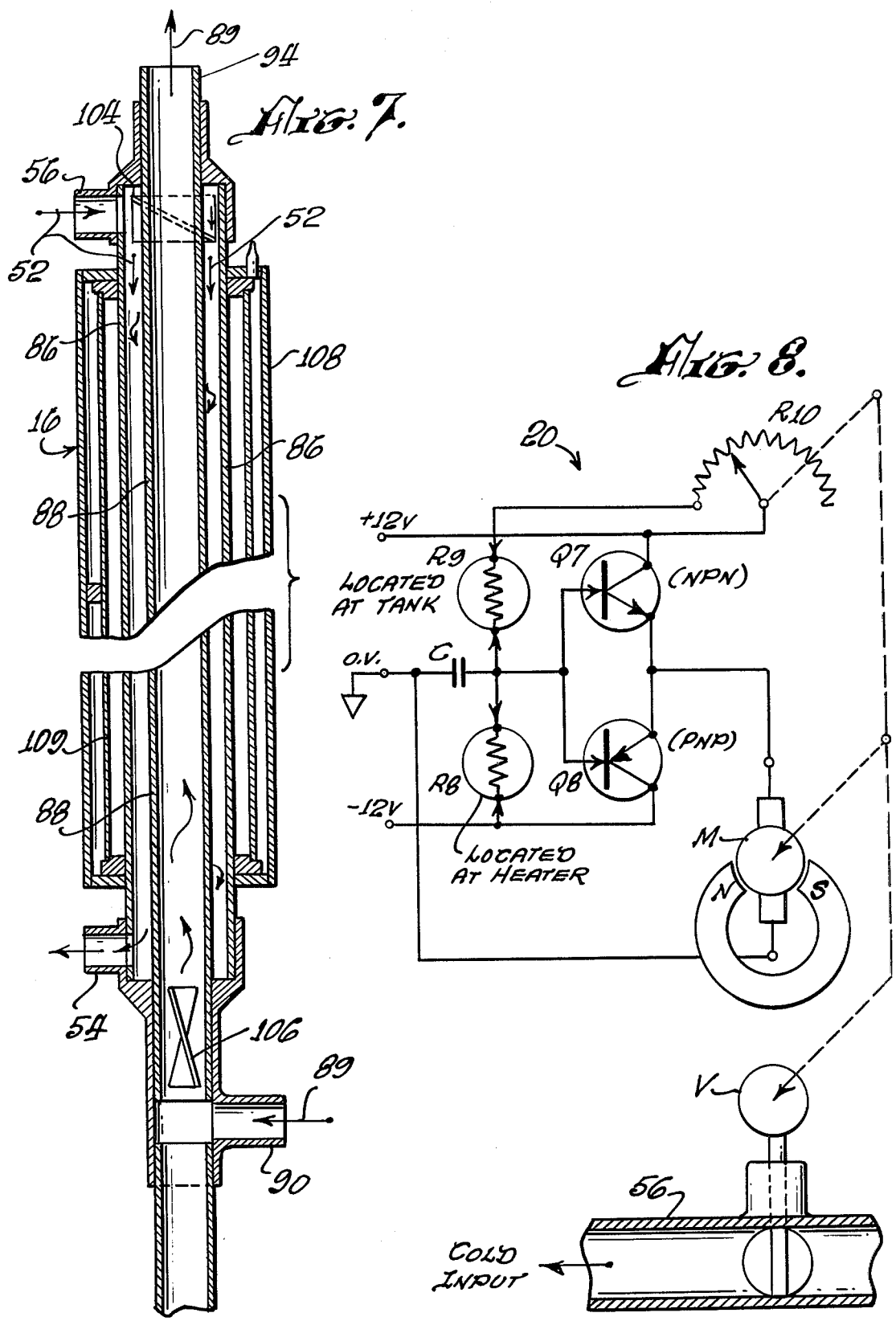

1

SOLAR LIQUID HEATING APPARATUS

STATEMEMT OF GOVERNMENTAL INTEREST

The invention described herein may be manufactured and used by or for the Government of the United States of America for governmental purposes without the payment of any royalties thereon or therefore.

BACKGROUND OF THE INVENTION

This invention relates to solar heating apparatus, and more particularly to such apparatus and system that concentrates the solar energy, and automatically tracks the sun throughout its daylight path to achieve a high temperature heat transfer, and for controlling and maintaining the desired temperature of the stored liquid medium.

Solar water heaters have been employed for many years throughout the world. They can be classified generally in two categories, namely panel solar heaters, and concentrator solar heaters, depending on the temperature requirements of the particular installation. The concentrator type of solar heater, of which the present invention is an example, employs a parabolic or cylindrical heat collector to concentrate and focus the reflected solar energy for producing temperatures above 212° F to be suitable for use in steam heating applications, air conditioning, refrigeration systems, power generation, as well as other suitable heating applications up to 500° F.

In order to fully utilize a concentrator type of solar heater, it is desirable to track the sun, and accordingly, it is conventional to mount the reflecting surface for rotation about one or more axes. Examples of such construction is illustrated by U.S. Pat. Nos. 2,182,222 and 820,127.

However, neither of these patents nor the others in the art, disclose a suitable control means to enable the heat collector to be continuously and automatically guided and oriented in the most advantageous position with respect to the sun throughout its daylight travel. Nor does the art disclose the novel techniques for sensing and controlling the temperature of the stored liquid medium throughout the day.

SUMMARY OF THE INVENTION

The solar heater is provided with an improved solar heat concentrator having a network of preheating coils positioned in the mouth of a parabolic reflector, which coils are connected to a main heating tube positioned at the focal axis of the parabolic reflecting surface. This arrangement of coils enables the temperature of the circulating fluid medium to be preheated initially to above 150° F before passing through the main heating tube.

An automatic tracking circuit includes photocells and a collimator to follow the sun, and to control the heat collector driving means to maximize the heat transfer throughout the daylight hours.

The solar heater preferably employs a unique heat closed loop exchanger that transfers the solar heat absorbed by the working fluid mediums to a hot water storage loop.

A temperature sensing circuit and modulating valve device compares the temperatures at the heat concentrator and the storage facility to maintain optimum heat replenishment therebetween.

STATEMENT OF THE OBJECTS OF THE INVENTION

It is a principal object of this invention to provide a more efficient solar heater by having a movable heat collector, or concentrator, capable of automatically tracking the sun during daylight hours.

Another important object is to provide a solar concentrator having an arrangement of pipes to preheat the circulating working liquid to be heated.

Still further objects are to provide a solar heater with an improved heat exchanger; and a modulated fluid flow control system that adjusts the rate of flow for optimum heating conditions.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 7 is an enlarged longitudinal sectional view of a vacuum insulator heat exchanger.

FIG. 8 is a temperature sensing and modulating circuit.

DESCRIPTION OF THE PREFERRED EMBODIMENTS

Figure 1:
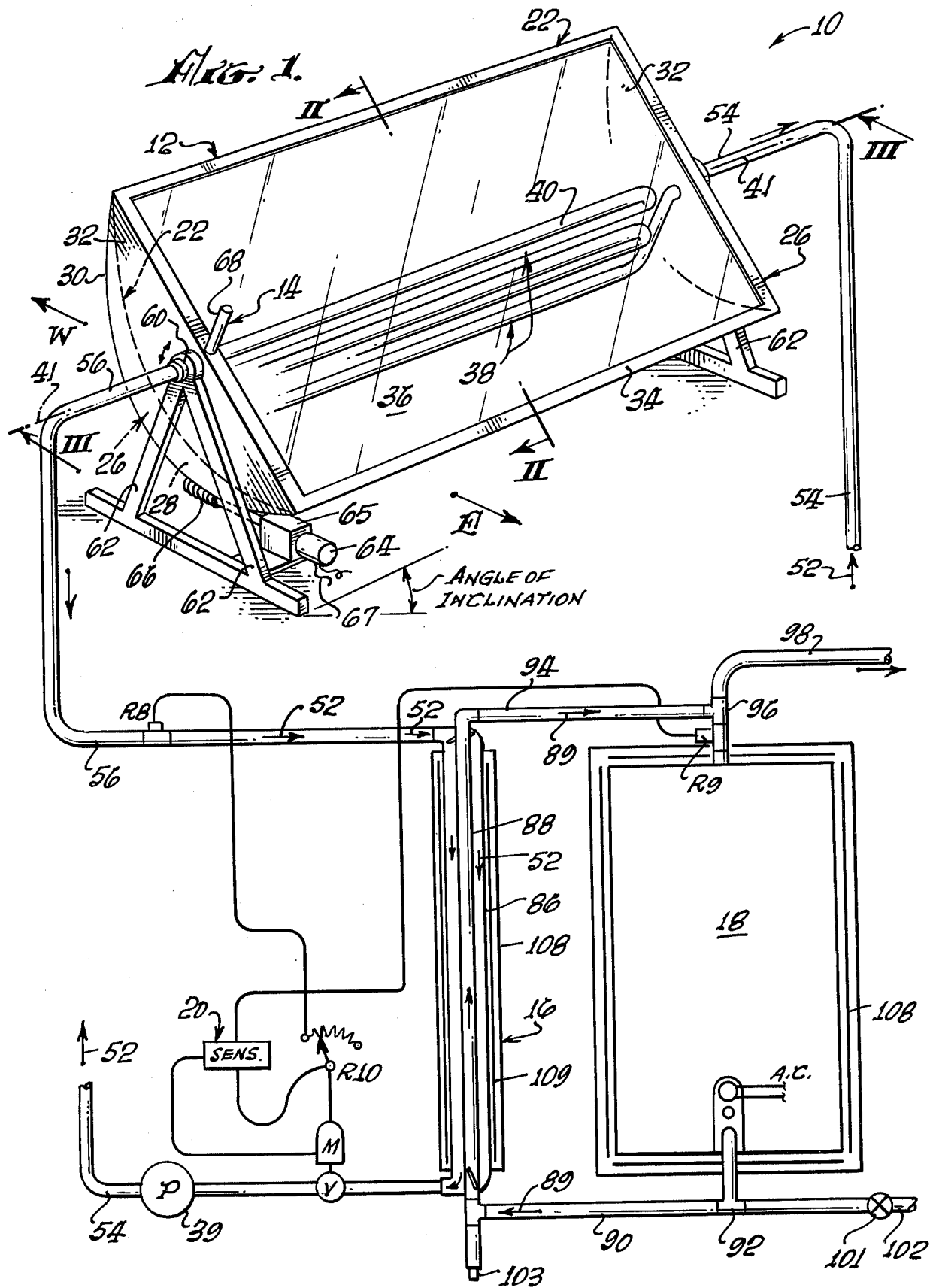
FIG. 1 is a general arrangement of the components of the novel solar heater apparatus, with the concentrator shown in isometric view.

Referring to the drawings where like reference numerals refer to similar parts throughout the figures there is shown in FIG. 1 a general arrangement of the basic components of the novel solar heater 10 as may be utilized preferably for steam generation. It should be understood that this basic solar heater can be incorporated in many different applications, such as forced air heating systems, air conditioning systems, steam or electric power generation, etc.

The illustrated solar heater 10 comprises at least one heat concentrator assembly 12; a solar collimator tracking apparatus 14 for the concentrator assembly; a heat exchanger 16 connected by piping between the concentrator assembly 12 and a hot water storage tank 18; and a temperature valve sensing system 20 electrically connected to concentrator 12 and to tank 18.

Figure 2:
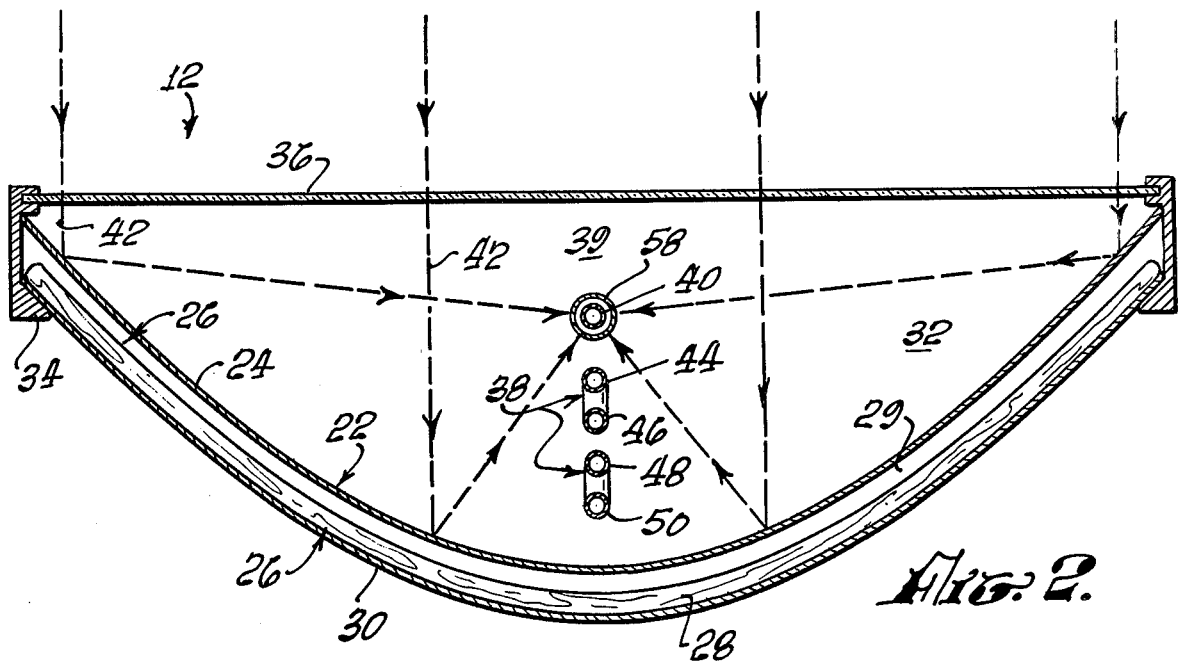
FIGS. 2 and 3 are sectional views of the novel concentrator taken along lines II—II and III—III of FIG. 1 showing the piping arrangement and other details.

As shown in FIG. 2, concentrator assembly 12 includes an inner reflector panel 22 having a mirrored outer surface 24, the panel being configured in cylindrical parabolic shape by an aluminum rectangular frame 26. A layer of foil surfaced, fiberglass insulation 28 is positioned between frame ribs 29 and sandwiched between inner panel 22 and outer aluminum panel 30. Panel 30 has a white enamelled finish to reduce solar heat loss. Concentrator assembly 12 is provided with flat end walls 32, which have a similar sandwiched fabrication as the parabolic section.

The edges of the combined sandwich panel assembly are supported together by channelled side frame members 34, which are also channelled to support one temperatured glass cover 36 for protecting the reflecting surface 24 from dirt and moisture, and for reducing heat losses from the wind.

Figure 3:
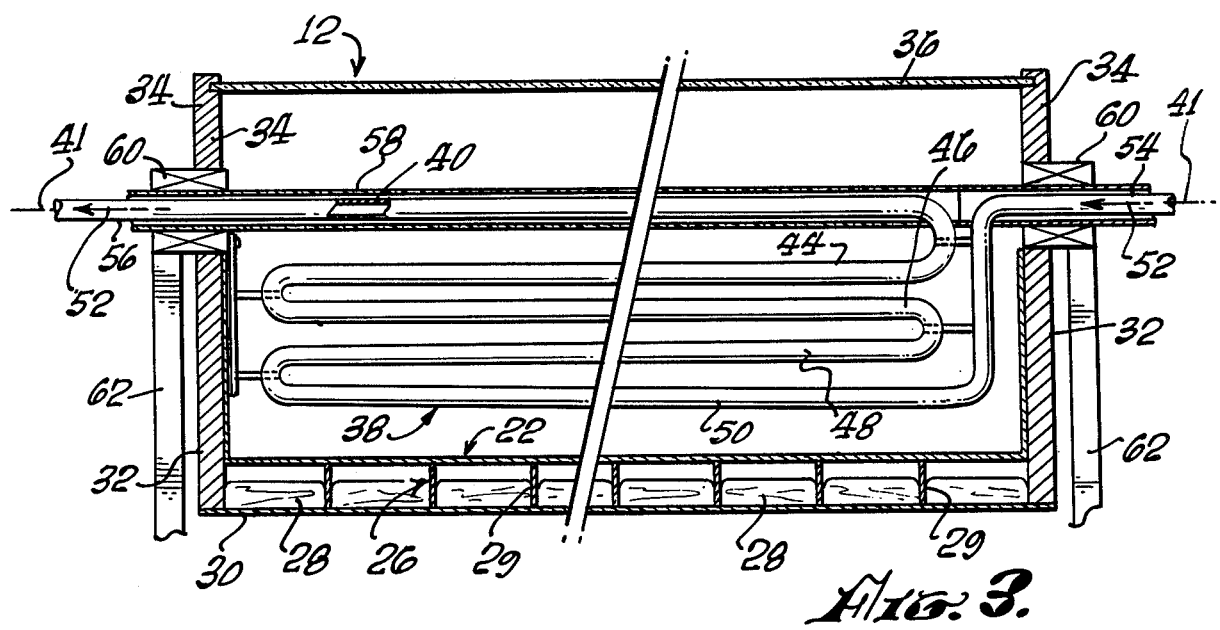

As is best illustrated in FIGS. 2 and 3, concentrator assembly 12 houses a unique piping system 38 made of copper or the like through which liquids can be circulated by a pump 39 (FIG. 1) in a simple direct hot water system; but preferably a working fluid, such as "Dowtherm," in a closed loop system using heat exchanger 16, as illustrated in FIG. 1, but which can be incorporated in tank 18.

Piping system 38 includes a circuitous arrangement of spaced, parallel pipe sections traversely aligned centrally the concentrator assembly, preferably oriented normal to the reflecting surface and with the rotational axis of the collector. An uppermost superheat pipe 40 is positioned along the focal axis 41 of the parabolic panel 22 so as to be in the path of the directly reflected solar light rays 42, (FIG. 2) the remaining preheat pipes 44-50 being suspended inwardly therefrom and subject to random reflected solar light rays. The path of the working liquid passing through these pipes is indicated by broken arrow 52 (FIGS. 1 and 3) entering concentrator 12 at inlet pipe 54 and passing through preheat pipes 44-50 and finally through main heater pipe 40 which superheats the liquid prior to discharge at outlet pipe 56. Outlet pipe 56 is located nearest to heat exchanger 16, or storage tank 18 when no heat exchanger is utilized, and is suitably insulated. Superheat pipe 40 may be enclosed within an evacuated glass tube 58 for insulation purposes. In systems that may utilize more than one reflector module, only the module located at the cold end of the liquid exchange system need be provided with the preheater tubes.

Concentrator panel 22 and its supporting frame 24 are rotatably mounted at each end around axis 41 through tubular roller bearings 60 secured in triangular side supports 62. Glass tube 58, which encloses superheat pipe 40, laterally terminates at a vacuum seal, not shown, where the preheat pipe section connects to pipe 40 near inlet 54 to enable preheat pipe 50 to extend through and remain fixed within bearings 60. Thus, the entire piping system 38 remains stationary while concentrator assembly 12 pivots thereabout, an arrangement which simplifies construction and reduces the weight of the reflector assembly to be driven by motor 64 through gear reduction 65 worm 66.

Concentrator assembly 12 oF FIGS. 1-3 is designed to be movable about a single axis 41, i.e., north/south orientation and at a given inclination, so as to be able to pivot from east to west tracking the sun from sunrise to sunset. Since optimum heating is obtained when the axis is parallel to the local latitude, or even 10° more, it may be desirable to raise the north end of the assembly to compensate for the sun's inclination. A suitable roof location or other support may provide the required inclination. The precise angle of concentrator assembly 12 facing the south will depend on the seasonal inclination. Optimum heating the year around is achieved by a fixed tilt angle (as shown in FIG. 1) from 33° at the San Diego area to 48° at the northern U.S. Border; 10° more will benefit winter heating. The sun inclination is plus and minus 23° from this equinox angles. Providing concentrator 12 with a fixed tilted arrangement is the most simple and adequate for most contemplated applications. However, if greater heat transfer efficiency is desired by also following the north/south inclination of the sun throughout the year, reflector assembly 12 can be pivotally mounted to be tilted manually or power driven in a manner similar to that described for the tracking mode.

Figure 4:
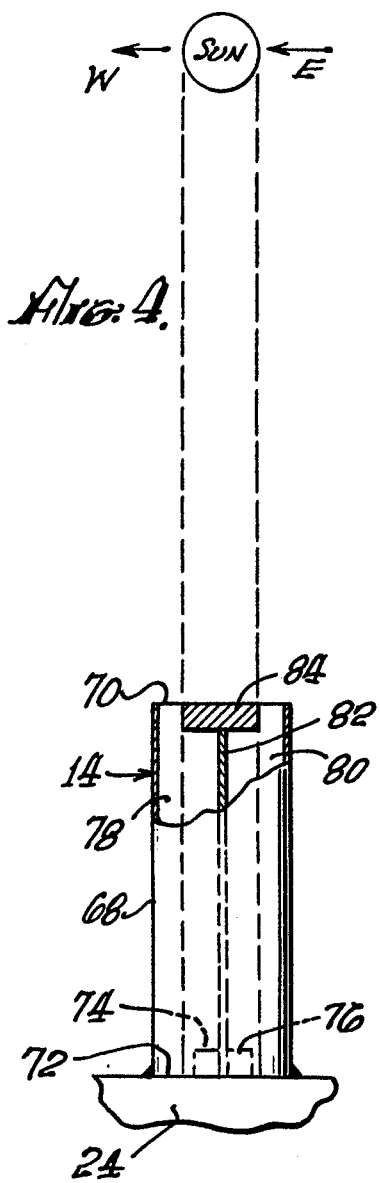
FIGS. 4 and 5 are side and top views, respectively, of a collimator housing photocells to sense the position of the sun.
Figure 5:
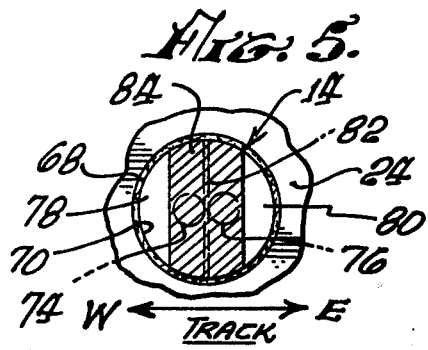

One of the unique features of this invention is to minimize heat loss in the early morning and late afternoon by providing concentrator drive motor 64 with an automatic tracking control circuit 67 to track the east-to-west path of the sun throughout the day. As shown broadly in FIG. 1, and detailed in FIGS. 4-6, tracking circuit 67 includes collimator 14 supported on the front of reflector frame 24 at the centerline of the concentrator. Collimator 14 comprises a cylindrical housing 68 having an open end 70, and a closed end 72 fixedly mounted to frame 24 providing a perpendicular orientation with respect to concentrator frame 24. At least two photocells, or the like, 74 and 76 are mounted to housing end 72, being spaced apart and oriented in an east-west alignment on each side of concentrator centerline 41. Housing 68 is separated into two longitudinal compartments 78 and 80 by a wall 82 forming a light barrier between the two photocells. The upper end of wall 82 supports a barrier plate 84 which provides a shadow to overlap photocells 74 and 76 when the sun is substantially aligned with the longitudinal axis of the collimator 14. In this position the collector is properly oriented with respect to the sun to achieve maximum heat transfer efficiency. Whenever the collimator, and the concentrator, become misaligned in any E-W position with respect to the sun because of interrupting clouds, etc., the respective photocell will be illuminated thereafter by the sun and heat concentrator 12 will be driven to cover said photocell, and restore the aligned condition without requiring a continuous current.

Figure 6:
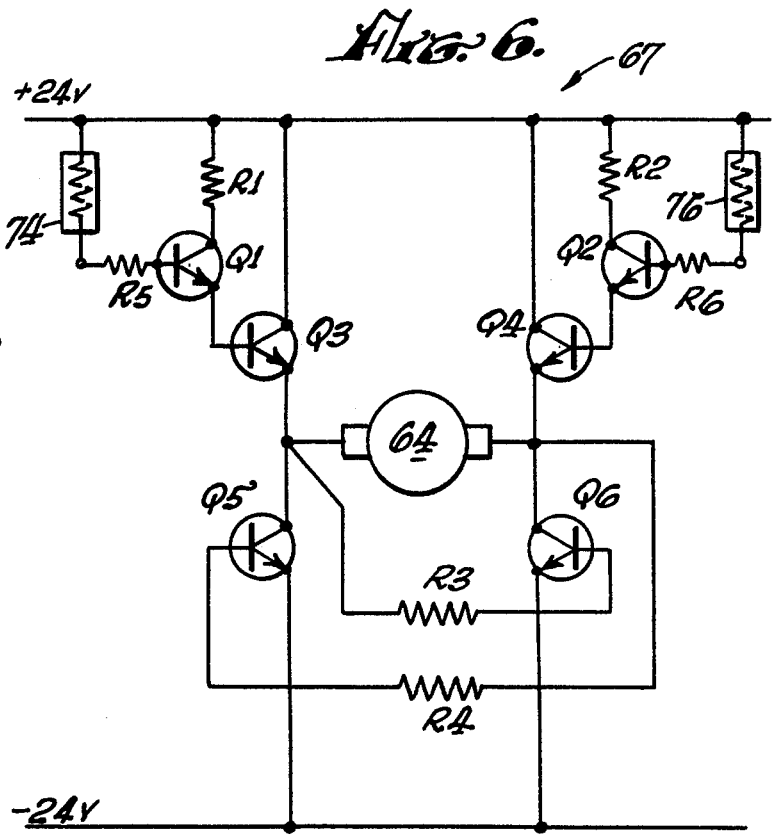
FIG. 6 is a tracking circuit utilizing the collimator of FIGS. 4 and 5 for controlling the movement of the solar concentrator.

As shown in FIG. 6, tracking circuit 67 incorporates photocells 74 and 76 in a simplified version of the apparatus, suitable for small heating systems such as may be operable on a plus and minus 12-volt D.C. power source, connected across concentrator drive motor 64, which in this application is a reversible 24-volt D.C. motor. For larger installations, an A.C. motor with reversible relays, or thyristor control, can be employed.

Photocell 74 is provided with a motor circuit including transistors Q1, Q3, Q6, current limiting resistor R1, and bias limiting resistors R3 and R5. Photocell 76 is provided with a motor circuit including transistors Q2, Q4, and Q5, current limiting resistor R2, and bias limiting resistors R4 and R6.

Operation of the tracking circuit is obvious from FIG. 6. For example, if photocell 74 is illuminated by the sun current flows through Q1, Q3, motor 64, and Q6, driving the concentrator 12 in a direction to uncover photocell 76. When the sun strikes photocell 76, the current flows through its respective motor circuit to drive concentrator 12 in the opposite direction. As long as both photocells are shielded from the sun, no power is consumed and the concentrator is properly aligned with the sun in its optimum position.

As previously stated, if desired, concentrator 12 can be provided with a tilt drive mechanism and a tilt circuit identical to tracking circuit 67. Tracking could also be done at a steady rate, with corrections being made by the above tracking circuit.

Another important feature of the invention resides in the construction of heat exchanger 16, shown in detail in FIG. 7, hydraulically connected between concentrator heater 12 and hot water storage tank 18. The use of the heat exchanger is necessary when a special working fluid 52 is used instead of water; and it is highly desirable to use a working fluid in place of water in a heat collector system to reduce undesirable deposits, to prevent freezing, to prevent corrosion and electrolysis, and to avoid the high steam pressures in high temperature systems with water. As shown in FIG. 1, the heat exchanger is separated from tank 18, but the same basic heat exchanger can be located within the tank and provide the same advantages to the storage system.

Exchanger 16 comprises two concentric tubes 86 and 88 having optimum dimensions, depending on the volume required for the specific application. Outer tube 86 provides a circuit for the working fluid 52 and is connected at its top to concentrator outlet 56, and at its bottom to concentrator inlet 54. Inner tube 88 provides a circuit for the hot water 89, and at the bottom is connected via inlet pipe 90 and T-joint 92 (FIG. 1) from the colder, bottom of storage tank 18; and from the water supply line via valve 101 and line 102. The upper end of tube 88 is connected by outlet pipe 94 to the upper end of tank 18 through T-joint 96. Hot water may be drawn either from the exchanger 16 directly or from the top of tank 18 via outlet pipe 98, as long as the steam pressure does not exceed the water supply pressure. A drain 103 is provided on the bottom of the exchanger 16 to facilitate removal of any sediment in the water supply. Vanes 104 and 106 are inserted into the inlets, near 56 and 103 respectively, to provide a rotary flow to the liquids so that cold water will travel to the outside and warm water toward the center of each tube to enhance the heat transfer therebetween. Heat exchanger 16 is provided with an evacuated outer insulating jacket 108, within which is mounted a concentric, cylindrical foil radiation barrier 109. Similar insulating means is recommended for storage tank 18 and the hot water piping.

Temperature sensing system 20, shown generally in FIG. 1, and in detail in FIG. 8, functions to prevent cooling of the stored hot water in tank 18 by colder water from the heat concentrator system 12, which may occur during night time, or long periods of interrupted sunlight.

Sensing circuit 20 is a simple comparison electrical circuit, which may also be powered by plus and minus 12-volt D.C. batteries, and includes two identical thermistors R8 and R9. Thermistor R8 is located in heat concentrator outlet pipe 56 and senses the temperature of the heated working fluid leaving the concentrator, while thermistor R9 is located in upper portion of hot water storage tank 18 and senses the temperature therein. Thermistor R8 is connected across NPN transistor Q7, while thermistor R9 is across PNP transistor Q8. The outputs of the transistors control a reversible 12-volt D.C. motor M ganged to a butterfly valve V located in concentrator inlet pipe 54 and to a rheostat R10.

In operation, as the temperature of the working fluid in the concentrator rises, the resistance of R8 decreases which raises the voltage at condenser C and at the base NPN transistor Q7, and positive current flows through Q7 to drive motor M in the positive direction. This movement starts the opening of valve V and moves rheostat R10 to compensate for the resistance lost by R8 as it is heated. At a certain point, the sum of R8 and R10 will equal the value of R9, the voltage at C returning to zero and the motor will stop as will valve V. If the working fluid temperature rises higher, the process will be repeated to again balance the system.

Should a cloud shade concentrator 12 from the sun, or at sunset, the resistance of R8 will increase, lowering the voltage at C and to the base of Q8. This drives negative current through PNP transistor Q8 and motor M, thereby reversing the motor and starts closing valve V; and R10 again balances the systems to stop motor M. This not only starts and stops the working liquid flow from the collector, it also modulates the rate of working liquid flow through the one or more collectors to maintain the optimum rate of flow for the conditions at any given time. If sunlight is plentiful, valve V will be opened wide, but any condition that reduces the insolation will reduce the rate of working fluid flow until the heating condition improves. Whenever the temperature in the tank at R9 is higher than the working fluid temperature at R8, valve V will be closed until heating is again favorable.

The novel solar heat exchanger system described above provides a more efficient and inexpensive manner of utilizing solar energy.

Obviously many modifications and variations of the present invention are possible in the light of the above teachings. It is therefore to be understood that within the scope of the appended claims the invention may be practiced otherwise than as specifically described.

I claim:

1. Solar heating and tracking apparatus comprising:
   a solar concentrator having a parabolic reflecting surface;
   a main heater pipe supported along the focal axis of said parabolic surface and being directly in the path of the reflected rays;
   said pipe having an inlet and an outlet for the passage of a liquid heat absorbing medium;
   a plurality of preheater pipes connected to the main heater pipe and disposed between the main heater pipe and the reflecting surface; means for supporting said solar concentrator for pivotal movement about at least one axis for tracking the movement of the sun;
   means for driving said concentrator around said axis responsive to a given signal;
   tracking control means for following the path of the sun and for generating the signal to control said driving means;
   whereby the concentrator will be guided to track the sun's path to maximize the heat transfer throughout the daylight hours.

2. The apparatus of claim 1 wherein said tracking means comprises a collimator system housing at least two photocells separated by a light barrier oriented normal to the direction of apparatus travel, one photocell located on each side of the respective axis, said photocells being electrically connected to a tracking control circuit with said driving means.

3. The apparatus of claim 2 wherein said control circuit includes two identical portions, one connected to each photocell, and said driving means includes a reversible motor capable of being driven in opposite directions by respective circuit portions.

4. The apparatus of claim wherein:
   the outlet of said main heater pipe is connected to a heat exchanger comprising concentrically nested pipes spaced apart to form an outer passage therebetween, the inner pipe forming an inner passage;

one of said passages connected to a liquid storage tank, and the other passage connected to the inlet and outlet of said solar concentrator;

baffle means fixedly mounted in the entrance of each passage in the heat exchanger for causing the liquid medium to have a spiral flow therethrough and by centrifugal action enhance heat transfer.

5. The apparatus of claim 4 wherein an outer evacuated concentric chamber is provided around the outer nested pipe, said evacuated chamber having a concentrically spaced radiation barrier.

6. The apparatus of claim 1 wherein said reflecting surface can be driven independently of the main pipe and preheater pipe.

* * * * *

UNITED STATES PATENT AND TRADEMARK OFFICE
CERTIFICATE OF CORRECTION

PATENT NO. : 4,098,264

DATED : July 4, 1978

INVENTOR(S) : Hal R. Brokaw

It is certified that error appears in the above–identified patent and that said Letters Patent are hereby corrected as shown below:

Claim 4, line 1, insert -- 1 -- after "claim".

Signed and Sealed this

Second Day of January 1979

[SEAL]

Attest:

RUTH C. MASON
Attesting Officer

DONALD W. BANNER
Commissioner of Patents and Trademarks